United States Patent
Tian et al.

(10) Patent No.: US 12,059,011 B2
(45) Date of Patent: Aug. 13, 2024

(54) CONFECTIONERY PRODUCTS WITH INTENSE INITIAL COOLING AND EXTENDED STABILITY AT A HIGH HUMIDITY ENVIRONMENT

(71) Applicant: WM. WRIGLEY JR. COMPANY, Chicago, IL (US)

(72) Inventors: Minmin Tian, Naperville, IL (US); Armando J. Castro, Westchester, IL (US); Eric J. Dowd, Chicago, IL (US); Rachel Zhao, Guangzhou (CN)

(73) Assignee: Wm. Wrigley Jr. Company, Chicago, IL (US)

( * ) Notice: Subject to any disclaimer, the term of this patent is extended or adjusted under 35 U.S.C. 154(b) by 798 days.

(21) Appl. No.: 16/980,464

(22) PCT Filed: Mar. 18, 2019

(86) PCT No.: PCT/US2019/022796
§ 371 (c)(1),
(2) Date: Sep. 14, 2020

(87) PCT Pub. No.: WO2019/182994
PCT Pub. Date: Sep. 26, 2019

(65) Prior Publication Data
US 2021/0051974 A1  Feb. 25, 2021

Related U.S. Application Data

(60) Provisional application No. 62/644,936, filed on Mar. 19, 2018.

(51) Int. Cl.
*A23G 3/48* (2006.01)
*A23G 3/42* (2006.01)
*A23G 3/54* (2006.01)

(52) U.S. Cl.
CPC ............. *A23G 3/48* (2013.01); *A23G 3/42* (2013.01); *A23G 3/54* (2013.01); *A23G 2200/06* (2013.01); *A23G 2220/20* (2013.01)

(58) Field of Classification Search
None
See application file for complete search history.

(56) References Cited

U.S. PATENT DOCUMENTS

| | | | |
|---|---|---|---|
| 4,983,394 A * | 1/1991 | Hussein | A23G 3/50 424/440 |
| 5,165,943 A | 11/1992 | Patel et al. | |
| 5,284,659 A * | 2/1994 | Cherukuri | A23G 3/36 424/435 |
| 6,627,233 B1 | 9/2003 | Wolf | |
| 2003/0198713 A1 | 10/2003 | Clark | |
| 2006/0159819 A1* | 7/2006 | Witkewitz | A23L 27/2028 426/534 |
| 2007/0221236 A1 | 9/2007 | Kiefer | |
| 2007/0248717 A1* | 10/2007 | Johnson | A23G 4/062 426/660 |

FOREIGN PATENT DOCUMENTS

| | | |
|---|---|---|
| CN | 101119643 A | 2/2008 |
| WO | 9944436 A1 | 9/1999 |
| WO | 2005082154 A1 | 9/2005 |
| WO | 2006068994 A1 | 6/2006 |
| WO | 2006071749 A1 | 7/2006 |

OTHER PUBLICATIONS

Guoping, Yong, Preliminary Study on Menthol β-Cyclodextrin Inclusion compound, Preliminary Study on Menthol β-Cyclodextrin Inclusion compound, Food Science, CN, vol. 17, No. 9, pp. 34-36, Sep. 30, 1996.

* cited by examiner

*Primary Examiner* — Jyoti Chawla

(57) ABSTRACT

The present disclosure is directed to confectionery products, such as compressed mint tablets, that comprise menthol and eucalyptol. In certain embodiments, the menthol is encapsulated. The confectionery products deliver a strong initial cooling impact, and have extended storage stability in high humidity environments.

8 Claims, 4 Drawing Sheets

A) Neat menthol (Formula Ex. 1)

B) Evogran®-menthol (Formula Ex. 5)

C) Polysaccharide-menthol (Formula Ex. 7)

D) Cyclodextrin-menthol (Formula Ex. 9)

E) Xylitol syrup coated mints.

CONFECTIONERY PRODUCTS WITH INTENSE INITIAL COOLING AND EXTENDED STABILITY AT A HIGH HUMIDITY ENVIRONMENT

BACKGROUND OF THE DISCLOSURE

The present disclosure is directed to confectionery products, such as compressed mint tablets, that comprise menthol and eucalyptol. In certain embodiments, the menthol is encapsulated. The confectionery products deliver a strong initial cooling impact, and have extended storage stability in high humidity environments.

Freshening breath is one of the primary reasons for consumer purchase of chewing gum and mints. Various confectionery products have been developed that produce a long lasting cooling, freshening, and flavor duration. Some consumers, however, prefer to have a strong instant (e.g., within 1 minute of consumption) cooling and freshening effect. Unlike gum pellets, which may be formulated to release large amounts of flavor quickly upon chewing, mints, such as compressed mint tablets, are confectionery candies that are designed to be sucked by consumers and to dissolve slowly over time. Consequently, only a fraction of the coolant present in the mint is released into the oral cavity during the first minute of consumption, resulting in a weak initial cooling effect.

Additionally, some consumers prefer a strong nasal cooling effect. A strong, nasal cool not only provides a superior breath freshening effect, but can also deliver alertness, focus enhancement, and provide other cognitive benefits to consumers. Further, the nasal cooling effect may help consumers in ameliorating a stuffy nose, which is an effect typically delivered by cough drop candies.

A variety of flavors and coolants are known for use in confectionery products for producing cooling effects. However, as demonstrated in the comparative examples herein, not all coolants are capable of producing a strong initial cooling effect or a strong nasal cooling effect when incorporated into confectionery products, such as compressed mint tablets.

Menthol and eucalyptol are two flavors widely used as coolants, and are capable of producing a nasal cooling effect. However, current regulations limit the amount of menthol that can be included in compressed mint candies (e.g., 5% by weight or less), such as mint tablets. As such, formulating mint tablets that produce a strong initial nasal cooling effect has been challenging.

It would thus be desirable to provide a confectionery product, such as a compressed mint tablet, that is capable of producing a strong initial nasal cooling effect.

SUMMARY OF THE DISCLOSURE

The present disclosure is directed to confectionery products, such as compressed mint tablets, that comprise menthol and eucalyptol. In certain embodiments, the menthol is encapsulated. The confectionery products deliver a strong initial cooling impact, and have extended storage stability in high humidity environments.

In one aspect, the present disclosure is directed to a confectionery product comprising eucalyptol and menthol, wherein at least a portion of the menthol is encapsulated menthol.

In another aspect, the present disclosure is directed to a confectionery product comprising menthol and eucalyptol, wherein the weight ratio of menthol to eucalyptol in the confectionery product is from about 2:1 to about 5:1.

In another aspect, the present disclosure is directed to a compressed mint tablet comprising a first layer comprising a first confectionery composition and a second layer comprising a second confectionery composition comprising menthol and eucalyptol, wherein the second confectionery composition comprises menthol in an amount of about 1.0% to about 3.0% by weight of the second confectionery composition. In one embodiment, the second layer surrounds the first layer. In another embodiment, the mint tablet further comprises a third layer comprising a third confectionery composition.

In another aspect, the present disclosure is directed to a compressed mint tablet comprising a first layer comprising a first confectionery composition and a second layer surrounding the first layer comprising a second confectionery composition, wherein the second confectionery composition comprises menthol, eucalyptol, xylitol, and isomalt.

Other aspects of the present disclosure are described elsewhere herein.

BRIEF DESCRIPTION OF THE DRAWINGS

FIG. 1A: duo layer tablet; FIG. 1B: trio layer tablet; FIG. 1C: coated tablet.

FIG. 4A: neat menthol; FIG. 4B: Evogran®-menthol; FIG. 4C: polysaccharide encapsulated-menthol; FIG. 4D: cyclodextrin-menthol; FIG. 4E: xylitol syrup coated mints.

DETAILED DESCRIPTION OF THE DISCLOSURE

Figures 1A, 1B, 1C:
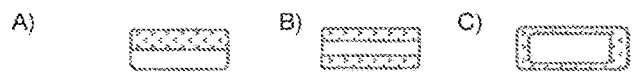
FIGS. 1A-1C are illustrations of multi-layer tablets of the present disclosure.

The present disclosure is directed to confectionery products, such as compressed mint tablets, that comprise menthol and eucalyptol. The confectionery products deliver an intense cooling sensation to a consumer during the first 2 minutes of consumption, including nasal cooling, and have extended storage stability in high humidity environments.

Preferably, the intense initial cooling is achieved within 2 minutes of consumption, more preferably, within 90 seconds of consumption, or within 60 seconds of consumption, or within 30 seconds of consumption, or within 15 seconds of consumption. In certain embodiments, the cooling impact may extend for a period of time after the confectionery product has been fully consumed (e.g., after a mint tablet has fully dissolved). In some embodiments, the cooling impact may extend for at least 1 minute, or at least 2 minutes, or at least 5 minutes, or at least 10 minutes after the confectionery product has been fully consumed.

Menthol and Eucalyptol

The confectionery products of the present disclosure deliver a strong nasal cooling effect through inclusion of menthol and eucalyptol. In certain embodiments, the early and intense nasal cooling of the presently disclosed subject matter can be incorporated into confectionery products including, but not limited to, cakes, cookies, pies, candies (hard and soft), compressed mints, chewing gums, compressed chewing gums, chewy candies, gelatins, ice creams, sorbets, jams, jellies, chocolates, fudge, fondant, liquorice, and taffy. Preferably, the intense and upfront nasal cooling formulations of the presently disclosed subject matter are incorporated into compressed mints.

In certain embodiments, the confectionery products of the present disclosure (such as a compressed mint tablet) may comprise menthol in an amount of less than 1% by weight of the confectionery product, or in an amount of about 0.45% to about 1% by weight of the confectionery product.

In certain embodiments, the confectionery products of the present disclosure (such as a compressed mint tablet) may comprise eucalyptol in an amount of about 0.1% to about 1% by weight of the confectionery product, or in an amount of about 0.4% to about 0.6% by weight of the confectionery product. In one embodiment, the confectionery product comprises eucalyptol in an amount of about 0.5% by weight of the confectionery product.

Eucalyptol may impart a strong smell and taste that is not preferred by some consumers. In particular, at certain concentrations, eucalyptol may have a medicinal taste, which may be undesirable in confectionery products. It has now been discovered that inclusion of menthol and eucalyptol in confectionery products at a weight ratio of menthol to eucalyptol of about 2:1 to about 5:1 provides a strong nasal cooling effect, while avoiding the undesirable smell and taste associated with eucalyptol.

Thus, in another aspect, the present disclosure is directed to a confectionery product (such as a compressed mint tablet) comprising menthol and eucalyptol, wherein the weight ratio of menthol to eucalyptol in the confectionery product is from about 2:1 to about 5:1. In another aspect, the present disclosure is directed to a confectionery product comprising menthol and eucalyptol, wherein the weight ratio of menthol to eucalyptol in the confectionery product is from about 2:1 to about 4:1, or from about 2:1 to about 3:1. In one embodiment, the weight ratio of menthol to eucalyptol in the confectionery product is about 2:1.

In some embodiments, the confectionery product is a multi-layered tablet, as described herein. In such embodiments, the weight ratio of menthol to eucalyptol may vary among one or more of the tablet layers. Preferably, the weight ratio of menthol to eucalyptol in each layer of the tablet will be from about 2:1 to about 5:1. In one embodiment, the multi-layer tablet is a duo layer tablet or a coated tablet, as described herein, wherein the weight ratio of menthol to eucalyptol in the second confectionery composition, which in certain aspects can form a second "thinner" layer, is from about 2:1 to about 5:1, or from about 2:1 to about 4:1, or from about 2:1 to about 3:1, or is about 2:1. In one embodiment, the second confectionery composition may comprise menthol in an amount of from about 0.5% to about 5%, or about 1% to about 3%, or about 2.5% to about 3.5% by weight of the second confectionery composition, and eucalyptol in an amount of about 0.1% to about 3%, or about 0.1% to about 1.5% by weight of the second confectionery composition.

In yet another embodiment, the second confectionery composition may comprise menthol in an amount from about 3.0% to about 3.5% by weight of the second confectionery composition, and eucalyptol in amount of 0.5% to about 1% by weight of the second confectionery composition.

In one embodiment, the multi-layer tablet is a trio layer tablet, as described herein, wherein the weight ratio of menthol to eucalyptol in each of the second and third confectionery compositions (forming the second and third "thinner" layers, respectively) is from about 2:1 to about 5:1, or from about 2:1 to about 4:1, or from about 2:1 to about 3:1, or is about 2:1. In one embodiment, the second and third confectionery composition may each comprise menthol in an amount of from about 0.5% to about 5.0% by weight of the second or third confectionery composition, and eucalyptol in an amount of about 0.1% to about 3%, or about 0.1% to about 1.5% by weight of the second or third confectionery composition.

Encapsulated Menthol

One drawback to the use of menthol in confectionery products is menthol stability. In particular, confectionery products, such as compressed mint tablets, containing high levels of menthol may exhibit menthol sublimation from the mint matrix, resulting in the formation of hairy-like menthol crystals on the mint tablets. The hairy menthol crystals may resemble mold or mildew, resulting in consumer dissatisfaction with the product. This phenomenon is particularly significant at high humidity and low temperature environmental conditions, and in compressed mint tablets containing levels of menthol greater than 0.45% by weight.

It has now been discovered that menthol sublimation may be reduced or prevented in confectionery products, such as compressed mint tablets, by encapsulating all or a portion of the menthol present in the confectionery product. Thus, in one aspect, the present disclosure is directed to a confectionery product comprising eucalyptol and menthol, wherein at least a portion of the menthol is encapsulated menthol. In one particular embodiment, the confectionery product is a compressed mint tablet. In another embodiment, the confectionery product is a multi-layer tablet (e.g., a duo layer tablet, a trio layer tablet, a coated tablet), as described herein.

Figure 2:
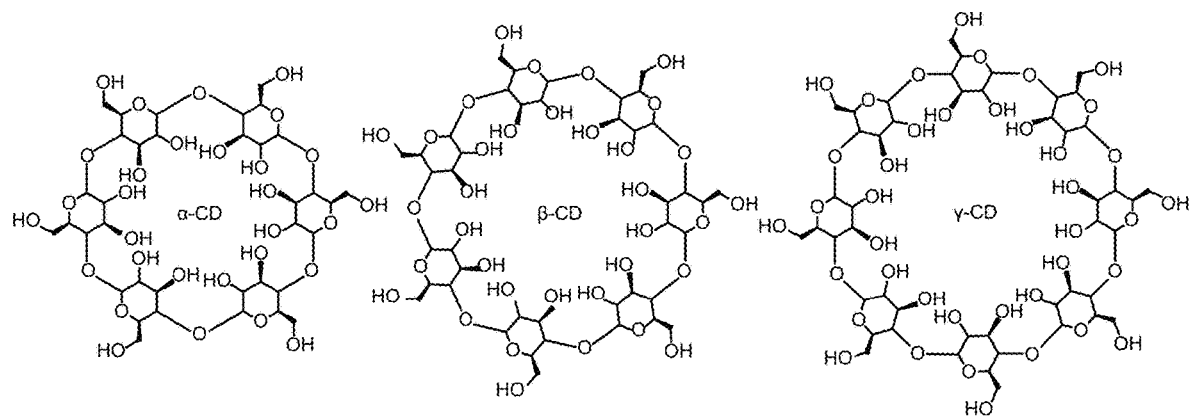
FIG. 2 depicts the structure of alpha-cyclodextrin, beta-cyclodextrin, and gamma-cyclodextrin.

In one embodiment, the menthol is encapsulated with cyclodextrin (e.g., is "cyclodextrin-menthol"). Cyclodextrin is a family of compounds produced from starch by means of enzymatic conversion. Cyclodextrin may comprise 6 alpha-, 7 beta-, or 8 gamma-glucose units connected by 1-4 linkages in a ring structure. The cage-like cyclodextrin molecule has a hydrophilic shell and a hydrophobic center. Cyclodextrin compounds are highly water soluble. Gamma-cyclodextrin has extremely low toxicity, and is regulatory approved for food. The structures of alpha-, beta-, and gamma-cyclodextrin are set forth in FIG. 2. It has now been discovered that the cage size of cyclodextrin, and in particular, beta- or gamma-cyclodextrin, fits menthol (a hydrophobic molecule) well, and prevents menthol from sublimation. Thus, in one particular embodiment, the menthol is encapsulated with beta- or gamma-cyclodextrin.

Menthol may be encapsulated with cyclodextrin (e.g., with beta- or gamma-cyclodextrin) by mixing menthol and the cyclodextrin with water, and homogenizing to form a slurry. In one embodiment, the menthol-cyclodextrin slurry is subsequently spray dried using any conventional spray drying apparatus to form cyclodextrin-menthol capsules. The concentration of the menthol in the menthol-cyclodextrin slurry may vary depending on the desired concentration of menthol in the encapsulated menthol. Typically, menthol makes up from about 5% to about 30%, and more typically from about 10% to about 30%, or about 10% to about 20% of the total weight of the encapsulated menthol. In one embodiment, the encapsulated menthol comprises menthol in an amount of about 10% by weight of the encapsulated menthol. In another embodiment, the encapsulated menthol comprises menthol in an amount of about 20% by weight of the encapsulated menthol.

In addition to reducing or preventing menthol hairy crystal formation, encapsulating menthol with cyclodextrin also improves menthol stability by improving the retention of menthol in confectionery products after extended storage. In particular, it has been discovered that encapsulating menthol with cyclodextrin improves retention of menthol in compressed mint tablets after storage for at least four weeks under low temperature, high humidity conditions (e.g., 20° C./85% RH), as compared to compressed mint tablets containing neat menthol. Unexpectedly, the presence of cyclodextrin-menthol in confectionery products (e.g., mint tablets) not only improves the retention of menthol upon storage, but also improves the retention of the eucalyptol present in the confectionery product, even though eucalyptol is not directly encapsulated by the cyclodextrin. In particular, as demonstrated in the examples, it has been unexpectedly discovered that compressed mint tablets comprising cyclodextrin-menthol show improved retention of eucalyptol in the tablets after storage for at least four weeks under low temperature, high humidity conditions (e.g., 20° C./85% RH), as compared to compressed mint tablets containing neat menthol. Advantageously, the improved stability of menthol (and eucalyptol) achieved through use of cyclodextrin-menthol, can be achieved even without storage in the presence of a desiccant.

The confectionery products of the present disclosure may be formulated such that all (i.e., 100%) of the menthol present in the product is encapsulated menthol, such as cyclodextrin-menthol. Alternately, the confectionery products may comprise a combination of neat menthol and encapsulated menthol. In addition, the confectionery products may comprise a center with neat menthol and a coating layer with isomalt or xylitol. In embodiments where the confectionery product is a multi-layered tablet, as described herein, the encapsulated menthol may be present in one or more of the tablet layers. For example, the encapsulated menthol may be present in the first layer (e.g., in the first confectionery composition), in the second layer (e.g., in the second confectionery composition), in the third layer (e.g., in the third confectionery composition, when present), or any combination thereof. In one embodiment, the multi-layer tablet is a duo layer tablet or a coated tablet, as described herein, wherein the second confectionery composition comprises encapsulated menthol, and the first confectionery composition comprises encapsulated menthol, neat menthol, or combinations thereof. In one embodiment, the multi-layer tablet is a trio layer tablet, as described herein, wherein the second and third confectionery compositions comprise encapsulated menthol, and the first confectionery composition forming the "center" layer, (and in some embodiments, the "thicker" layer) comprises encapsulated menthol, neat menthol, or combinations thereof.

Other types of encapsulated menthol are known, and may be used in the confectionery products of the present disclosure including, but not limited to, spray dried menthol, polysaccharide-menthol (e.g., formed from ground particles of a hydrocolloid, a cellulose, and menthol), wax-encapsulated menthol, large particle size menthol (e.g., 40-60 mesh size), and Evogran®-menthol (an encapsulated menthol available from Symrise GmbH & Co).

Amounts of menthol set forth herein should not be confused with amounts of encapsulated menthol. Specifically, the present disclosure provides weight percent amounts of menthol for inclusion in confectionery products. Such weight percentages are intended to include only the weight percent of menthol in the confectionery product, and not the weight of the cyclodextrin (or other encapsulant) present in any encapsulated menthol included in the confectionery product.

Multi-Layer Tablets

As discussed herein, the confectionery products of the present disclosure deliver an intense initial cooling sensation (less than 1 minute upon consumption), including nasal cooling. It has now been discovered that a strong initial nasal cooling effect may be achieved in compressed mint tablets using a multi-layer approach. The tablets are formulated to contain at least two layers, with at least one of the layers being thinner than another layer of the tablet. The thinner layer may be formulated to comprise high levels of menthol and eucalyptol. By including high levels of menthol and eucalyptol into the thinner layer, a larger amount of eucalyptol and menthol are released at the beginning of consumption, resulting in a strong initial nasal cooling effect, while still maintaining the overall menthol level in the mint tablet within regulatory limits.

Thus, in one embodiment, the present disclosure is directed to a confectionery product, such as a compressed mint tablet, comprising a first layer comprising a first confectionery composition, and a second layer comprising a second confectionery composition comprising menthol and eucalyptol, wherein the second confectionery composition comprises menthol in an amount of about 0.5% to about 5.0% by weight of the second confectionery composition. In one embodiment, the second layer surrounds the first layer to form a coated confectionery product. In some embodiments, the confectionery product further comprises a third layer comprising a third confectionery composition, which may also comprise eucalyptol and menthol. The third confectionery composition may also comprise menthol in an amount of about 0.5% to about 5.0% by weight of the third confectionery composition.

In certain aspects, the second layer (also referred to herein as a "coating layer" or "thinner layer") is thinner than the first layer (also referred to as a "thicker layer" or "center layer"). When the second confectionery composition is the second "thinner" layer, it will typically comprise less than 50% of the total weight of the confectionery product. More typically, the second confectionery composition will comprise from about 8% to about 45% of the total weight of the confectionery product (e.g., a mint tablet), or from about 10% to about 45% of the total weight of the confectionery product or from about 15% to about 30% of the total weight of the confectionery product, or from about 8% to about 10% of the total weight of the confectionery product. In embodiments where the confectionery product further comprises a third layer, the second layer and third layers will each typically be thinner than the first layer. In such embodiments, the second confectionery composition and the third confectionery composition together will typically comprise less than 50% of the total weight of the confectionery product (e.g., a mint tablet), or from about 8% to about 45% of the total weight of the confectionery product, or from about 10% to about 45% of the total weight of the confectionery product, or from about 15% to about 30% of the total weight of the confectionery product, or from about 8% to about 10% of the total weight of the confectionery product.

In one particular embodiment, the mint tablet is a duo layer tablet comprising two layers. One exemplary duo layer tablet is depicted in FIG. 1A. The duo layer tablet (10) comprises a first layer (11) comprising a first confectionery composition and a second layer (12) comprising a second confectionery composition. As discussed herein, in certain aspects, the second layer (12) is thinner than the first layer (11). In some embodiments, the second layer (12) forms an interface (14) with the first layer (11) along one side of the first layer, as depicted in FIG. 1A. Alternately, the second layer may form an interface with the first layer along multiple sides of the first layer. The thickness of the second layer need not be uniform throughout the entirety of the second layer, and it can be thinner than the first layer, and the total amount of the second confectionery composition. In an aspect of the invention, the second "thinner" layer comprises less than 50% of the total weight of the mint tablet, or from about 8% to about 45% of the total weight of the mint tablet, or from about 10% to about 45% of the total weight of the mint tablet, or from about 15% to about 30% of the total weight of the mint tablet, or from about 8% to about 10% of the total weight of the mint tablet. The second layer may be continuous, as depicted in FIG. 1A, or discontinuous (e.g., containing gaps within the layer). Preferably the second layer is continuous.

In another embodiment, the mint tablet is a trio layer tablet comprising three layers. One exemplary trio layer tablet is depicted in FIG. 1B. The trio layer tablet (20) comprises a first layer (11) comprising a first confectionery composition, a second layer (12) comprising a second confectionery composition, and further comprises a third layer (13) comprising a third confectionery composition. As discussed herein, in certain aspects, the second layer (12) and third layer (13) are each thinner than the first layer (11). In some embodiments, the first layer (11) forms an interface (14) with the second layer (12) along one side of the first layer, and an interface (15) with the third layer (13) along another side of the first layer (11), as depicted in FIG. 1B. In one embodiment, the interface (15) between the first layer and the third layer is generally parallel to the interface (14) between the first layer and the second layer, thus forming a tablet where the second layer is a top layer, the first layer is a center layer, and the third layer is a bottom layer, as depicted in FIG. 1B. The thickness of the second and third layers does not need to be uniform (i.e., uniformity of thickness within the second layer, within the third layer, or between the second and third layers is not required), so long as they are each thinner than the first layer, and the second confectionery composition and the third confectionery composition together comprise less than 50% of the total weight of the mint tablet, or from about 8% to about 45% of the total weight of the mint tablet, or from about 10% to about 45% of the total weight of the mint tablet, or from about 15% to about 30% of the total weight of the mint tablet, or from about 8% to about 10% of the total weight of the mint tablet. The second and third layers may be continuous, as depicted in FIG. 1B, or discontinuous (e.g., containing gaps within the layer). Preferably the second and third layers are continuous. In certain embodiments, the first confectionery composition of the trio layer tablet is the same as the first confectionery composition of the duo layer tablet, and the second confectionery composition of the trio layer tablet is the same as the second confectionery composition of the duo layer tablet. The second and third confectionery compositions of the trio layer tablet may be the same or different. In one embodiment, the second and third confectionery compositions are the same.

In one particular embodiment, the mint tablet is a coated tablet, such as is depicted in FIG. 1C. Like the duo layer tablet, the coated tablet (30) comprises a first layer (11) (also referred to herein as a "thicker" or "center" layer) comprising a first confectionery composition and a second layer (12) (also referred to herein as a "thinner" or "coating" layer) comprising a second confectionery composition. In the coated tablet, the second layer (12) completely surrounds the first layer (11) to form the coated confectionery product (30). As discussed herein, in certain aspects, the second layer (12) is thinner than the first layer (11). The thickness of the second layer need not be uniform, so long as it is thinner than the first layer, and the total amount of the second confectionery composition (i.e., forming the "thinner" or "coating" layer) comprises less than 50% of the total weight of the mint tablet, or from about 5% to about 45% of the total weight of the mint tablet, or from about 10% to about 45% of the total weight of the mint tablet, or from about 10% to about 30% of the total weight of the mint tablet, or from about 8% to about 10% of the total weight of the mint tablet. The second layer may be continuous, as depicted in FIG. 1C, or discontinuous (e.g., containing gaps within the layer). Preferably the second layer is continuous. In certain embodiments, the first confectionery composition of the coated tablet is the same as the first confectionery composition of the duo layer tablet.

The tablets may be of any shape. Although the tablets exemplified in FIGS. 1A, 1B, and 1C are generally rectangular in shape with flat sides, other tablet configurations, such as square, round, oval, elliptical, etc., are also contemplated. In one embodiment, the tablets of the present disclosure are generally elliptical in shape.

The first confectionery composition, which is used to form the first layer of the multi-layer tablets of the present disclosure, may be made by conventional means. The first confectionery composition may be formulated from a mixture of base materials, binders, flavors, and/or lubricants. The base material may be a sugar or a polyol. Among the sugars that may be used are sucrose, dextrose, lactose, maltose, and other common sugars. In addition, base materials may include non-sugar bulking agents. Among these are polyols such as sorbitol, maltitol, mannitol, xylitol, hydrogenated isomaltalose, lactitol, erythritol and combinations thereof. High-intensity sweeteners such as acesulfame K, aspartame, alitame, sucralose, glycyrrhizin, saccharin, stevia, neohesperdin dihydrochalcone, and cyclamates may also be included with the base materials.

Binders that are commonly used are natural gums and hydrocolloids such as gum arabic, guar gum, agar, alginates, gum tragacanth, gelatin, corn syrup, starches and maltodextrins. Most commonly used binders are gelatin, gum arabic and maltodextrins or corn syrups. When non-sugar polyols such as sorbitol are used as the base material, binders are not needed for binding since many of these polyols are easily compressed to form tablets. In some cases polyols such as sorbitol may also act as a binder and may be combined with sugar to form the base materials for the compressed tablet. Binders usually comprise about 2% to about 8% of the first confectionery composition.

Lubricants are used to give good release from the press tooling or die and punches. A variety of lubricants or non-stick agents may be used in a tablet to act as release agents. Some of these are starch, acetylated monoglycerides, waxes, lecithins, emulsifiers, and mono-, di-, or tristearates.

The most common of these lubricants are magnesium or calcium stearate and stearic acid. Solid lubricants are added to the tablet composition to help form the tablet and allow for its release from the tablet press. Lubricants usually comprise about 0.5% to about 2% of the first confectionery composition. In some instances, low levels of flow agents such as silicon dioxide are added to the tablet composition to help the flow of the mixture into the tablet press.

Flavoring agents are preferably added at a level of about 0.01% to about 2% by weight of the first confectionery composition. The flavoring agents may comprise essential oils, synthetic flavors, or mixtures including but not limited to oils derived from plants and fruits such as citrus oils, fruit essences, peppermint oil, spearmint oil, clove oil, oil of wintergreen, anise and the like. Artificial flavoring components are also contemplated for use in tablets of the present disclosure. Those skilled in the art will recognize that natural and artificial flavoring agents may be combined in any sensorially acceptable blend. All such flavors and flavor blends are contemplated by the present disclosure.

In addition, menthol and physiological cooling agents (sometimes referred to as high-intensity coolants) may be added to the first confectionery composition at a level of about 0.01% to about 1%, and more typically about 0.01% to about 0.5% by weight of the first confectionery composition. Except for menthol, these cooling agents are preferably pre-blended with the flavor before being added to the mixture of ingredients used to form the tablet. Menthol may be pre-blended with the flavor or may be added to the tablet composition mixture in its crystalline form. Typical cooling agents include substituted p-menthane carboxamides, acyclic carboxamides, menthone glycerol ketals, menthyl lactate, menthyl succinate, 3-1-menthoxypropane-1,2 diol, N-2,3-trimethyl-2-isopropylbutanamide (known as WS-23); N-[[5-methyl-2-(1-methylethyl)-cyclohexyl] carbonyl]glycine ethyl ester (WS-5), N-(4-methoxyphenyl)-p-menthane-3-carboxamide (WS-12) and eucalyptol. In one embodiment, the eucalyptol is included in the first confectionery composition as *eucalyptus* oil. In one particular embodiment, the cooling agent comprises menthol and eucalyptol.

In one embodiment, the menthol is included in the first confectionery composition in neat form. In another embodiment, the first confectionery composition comprises encapsulated menthol. Any form of encapsulated menthol may be used including, but not limited to, spray dried menthol, Acamel-menthol (e.g., formed from ground particles of acacia, methocel, and menthol), wax-encapsulated menthol, large particle size menthol (e.g., 40-60 mesh size), Evograe-menthol (an encapsulated menthol available from Symrise GmbH & Co), and cyclodextrin-menthol. In one particular embodiment, the menthol is cyclodextrin-menthol, such as described in detail herein.

Colors and other additives are also contemplated for use in the first confectionery composition.

The second confectionery composition, which is used to form the second layer of the multi-layer tablets of the present disclosure, and the third confectionery composition, which is used to form the third layer of the trio layer tablets, may be formulated from a mixture of any of the base materials, binders, flavors, and/or lubricants and amounts thereof set forth above for the first confectionery composition. In certain embodiments, the second and third confectionery compositions optionally may have the same formulation. In other embodiments, the second and third confectionery compositions are thinner that the first confectionery composition. Further, although the second and third confectionery compositions may be formulated from similar materials as used for the first confectionery composition, in some embodiments, the second and/or third confectionery compositions are different from the first confectionery composition. Mints, such as compressed mint tablets, are confectionery candies that are designed to be sucked by consumers and to dissolve slowly over time. As discussed herein, because the second and third confectionery compositions are thinner than the first confectionery composition, they will dissolve more rapidly upon consumption, resulting in a quicker release of components, than is achieved with the first confectionery composition. Thus, higher levels of menthol and/or eucalyptol may be incorporated into the second and third confectionery compositions to achieve a stronger initial cooling effect.

Thus, in one embodiment, the second confectionery composition comprises menthol in an amount of from about 0.1% to about 5% by weight of the second confectionery composition, or in an amount of from about 1% to about 3% by weight of the second confectionery composition. In certain embodiments, the second confectionery composition comprises menthol in an amount of from about 1% to about 3% by weight of the second confectionery composition, with the total amount of menthol in the confectionery product (e.g., a mint tablet) being maintained at less than 1% by weight of the confectioner product, or from about 0.45% to about 1% by weight of the confectionery product. The third confectionery composition may comprise the same amounts of menthol as set forth above for the second confectionery composition.

In one particular embodiment, at least a portion of the menthol present in the second and/or third confectionery compositions is encapsulated menthol. In one embodiment, all of the menthol present in the second and/or third confectionery compositions is encapsulated. Any of the encapsulated forms of menthol set forth herein for inclusion in the first confectionery composition may be used. In one preferred embodiment, the menthol in the second and/or third confectionery composition is encapsulated with cyclodextrin, such as gamma-cyclodextrin.

In one embodiment, the second confectionery composition further comprises eucalyptol in an amount of about 0.1% to about 3% by weight of the second confectionery composition, or in an amount of about 0.1% to about 1.5% by weight of the second confectionery composition. The third confectionery composition, when present, may comprise the same amounts of eucalyptol as set forth above for the second confectionery composition. In one embodiment, the second and/or third confectionery composition comprises eucalyptol and encapsulated menthol.

In one embodiment, the weight ratio of menthol to eucalyptol in the second confectionery composition is from about 2:1 to about 5:1, or from about 2:1 to about 4:1, or from about 2:1 to about 3:1, or is about 2:1. In one embodiment, the second confectionery composition may comprise menthol in an amount of from about 0.5% to about 5.0% by weight of the second confectionery composition, and eucalyptol in an amount of about 0.1% to about 1.5%, or about 0.5% by weight of the second confectionery composition.

In one embodiment, the weight ratio of menthol to eucalyptol in the third confectionery composition is from about 2:1 to about 5:1, or from about 2:1 to about 4:1, or from about 2:1 to about 3:1, or is about 2:1. In one embodiment, the third confectionery composition may comprise menthol in an amount of from about 0.5% to about 5.0% by weight of the third confectionery composition, and eucalyptol in an amount of about 0.1% to about 1.5%, or about 0.5% by weight of the third confectionery composition.

In one embodiment, the second and/or third confectionery composition comprises higher levels of high intensity sweeteners than found in the first confectionery composition in order to ameliorate any added bitterness or off-taste associated with the higher menthol level. Thus, in one embodiment, the second confectionery composition comprises a high intensity sweetener in an amount of from about 0.1% to about 2% by weight of the second confectionery composition, or from about 0.25% by weight to about 2% by weight of the second confectionery composition. The third confectionery composition may comprise the same amounts of high intensity sweeteners as set forth above for the second confectionery composition.

In one embodiment, the first confectionery composition and the second confectionery composition both comprise eucalyptol and menthol. In such embodiments, the mint tablets advantageously may produce both a strong initial cooling effect, as a result of the high levels of menthol and eucalyptol in the more rapidly dissolved second layer, as well as a lingering (i.e., longer lasting) cooling and freshening effect, as a result of the menthol and eucalyptol present in the first layer.

In one embodiment, the first confectionery composition and the second confectionery composition each comprise a high intensity sweetener and/or a base material selected from the group consisting of a sugar and a polyol. In one embodiment, the first confectionery composition is different in color than the second confectionery composition.

In one embodiment, the tablet may further comprise a third confectionery composition. In one embodiment, the first confectionery composition, the second confectionery composition, and the third confectionery composition all comprise eucalyptol and menthol. In another embodiment, the second confectionery composition and the third confectionery composition both comprise eucalyptol and encapsulated menthol. In one embodiment, the first confectionery composition, the second confectionery composition, and the third confectionery composition all comprise a high intensity sweetener and/or a base material selected from the group consisting of a sugar and a polyol. In one embodiment, the second confectionery composition and the third confectionery composition are different in color from the first confectionery composition.

Tablet Preparation

The tablets of the present disclosure can be made using conventional mixing and tableting techniques and equipment known in the art. For example, the compressed tablets may be prepared by wet granulation, dry granulation, or direct compression methods. In one embodiment, ingredients used for tableting are wet granulated before blending with the flavor and lubricant. In general, wet granulation involves mixing milled powders, preparing a wet mass by blending the milled powders with a binder solution, coarse screening the wet mass and drying the moist granules, screening the granules through a 14 to 20 mesh screen, mixing the screened granules with lubricants and disintegrate agents and finally tablet compressing the mass. In contrast, dry granulation generally involves milling of powders, compression into large hard tablets to make slugs, screening of slugs, mixing with lubricants and disintegrating agents and finally tablet compression. Most commonly, however, direct compressible material can be used for making the compressed tablet. In the direct compression method, the milled ingredients are mixed and then merely tableted by compression. More particularly, the base materials are dry blended along with any high-intensity sweeteners before any flavor is added. Liquid flavors and solid flavors are added slowly to the base materials and mixed in a dry material mixer, such as a ribbon mixer or a Hobart mixer. Lastly, the lubricant such as magnesium stearate is added, but not overmixed. Overmixing the mixture with magnesium stearate can reduce lubrication. In general, the final powder mixture is allowed to sit for up to 12 hours before being sent to the tablet press so that its properties will be suitable for tableting, including drying if the mixture is too damp.

In one embodiment, the duo layer tablets may be prepared by producing the first confectionery composition as described above, and depositing it in a mold to form the first layer of the confectionery product, and then producing the second confectionery composition, as described above, and depositing it on the first layer to form the second layer, followed by compression using any conventional tablet press. In one embodiment, the first layer may be given a pre-compression prior to addition of the second confectionery composition to the mold.

In one embodiment, the trio layer tablets may be prepared by producing the second confectionery composition, as described above, and depositing it in a mold to form the second layer of the confectionery product, and then producing the first confectionery composition, as described above, and depositing it on the second layer to form the first layer, and then producing the third confectionery composition, as described above, and depositing it on the first layer to form the third layer, followed by compression using any conventional tablet press. In one embodiment, the second layer may be given a pre-compression prior to addition of the first confectionery composition to the mold and/or the first confectionery composition may be given a pre-compression prior to addition of the third confectionery composition to the mold.

In one embodiment, the first ("center") layer of the coated tablets may be prepared as described above for the duo layer tablets, for example, by producing the first confectionery composition and depositing it in a mold, followed by compression using any conventional tablet press. In one embodiment, a conventional rotary tablet press may be used to produce the first ("center") layer of the coated tablet. Tablet presses may be obtained from Fette America, 300 Roundhill Dr., Rockaway, N.J.; Stokes Div. of DT Industries, 1500 Grundy's Lane, Bristol, Pa.; or Thomas Engineering, Inc. 575 W. Central Rd., Hoffman Estates, Ill. The basic steps of rotary tablet press operation involve four steps. The first step is to fill the die cavity; the second step is to adjust the fill by removing excess fill; the third step is compression; and the fourth step is ejection of the tablet from the die. In standard production equipment, there is also a pre-compression step before the final compression and then ejection.

Once the first ("center") layer has been formed, the center layer is coated with the second confectionery composition using any suitable coating technique known in the art. In one particular embodiment, the coated tablets are prepared using a pan coating technique. In a pan coating process, the second confectionery composition used to form the second ("coating") layer is initially present as a liquid syrup which contains from about 30% to about 80% or 85% of the composition ingredients previously described herein, and from about 15% or 20% to about 70% of a solvent such as water. In general, the pre-formed center layers to be coated are placed into the rotating pan to form a moving mass. The pre-formed center layers are tumbled in the pan while doses of the liquid coating syrup are applied, for instance by spraying or ladling. Between applications of the coating syrup, the tablets may optionally be dried, for instance, by passing a current of heated and/or dried air over or through the pellet bed. Numerous coats of the syrup may be applied, optionally alternating with applications of powdered coating material or an inert filler to accelerate the build-up of the coating layer. In some embodiments, a final layer of a polishing compound, for example carnauba wax, may be applied.

The syrup may be added to the pre-formed center layer at a temperature range of from about 100° F. to about 240° F. Mostly, the syrup temperature is from about 130° F. to about 160° F. throughout the process in order to prevent the polyol or sugar in the syrup from crystallizing. The syrup may be mixed with, sprayed upon, poured over, or added to the pre-formed center layers in any way known to those skilled in the art.

The coating layer may be built up by applying single coats, allowing the coats to dry, and then repeating the process. The amount of solids added by each coating step depends chiefly on the concentration of the coating syrup. Any number of coats may be applied to the pre-formed center layers. Generally, a sufficient amount of syrup is applied to yield a coated tablet, wherein the coating layer (i.e., the "second layer") comprises from about 8% to about 45% by weight of the total weight confectionery product (e.g., a mint tablet), or from about 10% to about 45% of the total weight of the confectionery product, or from about 15% to about 30% of the total weight of the confectionery product, or from about 8% to about 10% of the total weight of the confectionery product.

Those skilled in the art will recognize that in order to obtain the coating layer, a plurality of premeasured aliquots of coating syrup may be applied to the pre-formed center layers. It is contemplated, however, that the volume of aliquots of syrup applied to the pre-formed center layers may vary throughout the coating procedure.

Once a coating of syrup is applied to the pre-formed center layers, the wet syrup may be dried in an inert medium. In one embodiment, the drying medium comprises air. Forced drying air contacts the wet syrup coating in a temperature range of from about 70° F. to about 115° F. Generally, the drying air is in the temperature range of from about 80° F. to about 100° F. In one embodiment, the drying air possesses a relative humidity of less than about 15 percent, or less than about 8 percent.

The drying air may be passed over and admixed with the syrup coated pre-formed center layers in any way commonly known in the art. Generally, the drying air is blown over and around or through the bed of the syrup coated pre-formed center layers at a flow rate, for large scale operations, of about 2800 cubic feet per minute. If lower quantities of material are being processed, or if smaller equipment is used, lower flow rates would be used.

In one embodiment, a modified version of the above-described traditional pan coating process is used to coat the pre-formed center layers of the coated tablets. In this embodiment, the menthol, eucalyptol, high intensity sweeteners, and optionally flavors are mixed with isomalt to form a dry powder blend. A syrup is prepared containing a solvent, such as water, and composition ingredients as previously described herein other than menthol and eucalyptol. The pre-formed center layers are loaded into the coating pan and wetted with the syrup. The dry powder blend is then spread evenly across the tablet bed. This process may be repeated until the second ("coating") layer reaches the desired weight. In one embodiment, the process is repeated until the second ("coating") layer comprises from about 8% to about 45% of the total weight of the confectionery product (e.g., a mint tablet), or from about 10% to about 45% of the total weight of the confectionery product, or from about 15% to about 30% of the total weight of the confectionery product, or from about 8% to about 10% of the total weight of the confectionery product. Once the desired coating layer weight is reached, an additional coat of the syrup may optionally be applied to seal the coating layer, and the coated tablets dried.

This modified coating process, advantageously produces a coated tablet wherein the second ("coating") layer quickly dissolves, producing a strong initial nasal cool. The kick coating procedure also provides a quick and efficient means of coating. In particular, the entire coating process may be completed in approximately 15 to 30 minutes, unlike wet syrup coating, which may take several hours to complete.

In some embodiments, the multi-layer tablets of the present disclosure are about 0.3 to about 3.0 grams, including from about 0.5 to about 1.5 grams, or about 0.6 to about 1.2 grams in size.

Xylitol Coatings

In another embodiment, the present disclosure is directed to multi-layer mint tablets comprising a xylitol coating. In particular, it has been found that coated tablets comprising xylitol in the coating layer advantageously show good humidity stability.

Thus, in another aspect, the present disclosure is directed to a compressed mint tablet comprising a first layer comprising a first confectionery composition and a second layer surrounding the first layer and comprising a second confectionery composition, wherein the second confectionery composition comprises menthol, eucalyptol, and xylitol. In yet another aspect of the invention, the second confectionery composition comprises 90% to 95% by weight of the second confectionery composition.

Similarly to other coated tablets of the present disclosure, the second layer may be thinner than the first layer, and will typically comprise less than 50% of the total weight of the compressed mint tablet, including from about 8% to about 45% of the total weight of the compressed mint tablet, or from about 10% to about 45% of the total weight of the compressed mint tablet, or from about 15% to about 30% of the total weight of the compressed mint tablet, or from about 8% to about 10% of the total weight of the compressed mint tablet. In one embodiment, the second confectionery composition further comprises a high intensity sweetener. The first and second confectionery compositions may be formulated using any of the ingredients and amounts as set forth herein for preparation of other coated tablets.

The second confectionery composition may comprise menthol, eucalyptol, and high intensity sweeteners in amounts as set forth herein for other coated tablets. In one embodiment, the first confectionery composition also comprises menthol and eucalyptol.

In one embodiment, at least a portion of the menthol in the second confectionery composition is encapsulated menthol. In another embodiment, the menthol in the first confectionery composition is selected from the group consisting of neat menthol, encapsulated menthol, and combinations thereof.

In another embodiment, coated tablets containing xylitol in the second confectionery composition (forming the second "coating" layer of the coated tablets) are prepared by mixing menthol, eucalyptol, high intensity sweeteners, xylitol, and any other components of the second confectionery composition (e.g., binders) with water and heating to approximately 70-90° C. to produce a homogenous coating syrup. Preferably, the second confectionery composition comprises 90% to 95% by weight of the second confectionery composition. Pre-formed center layers, prepared as described above, are loaded into a coating pan, and continuously charged with the coating syrup, until the desired coating thickness is achieved.

EXAMPLES

Comparative Examples 1-5: Cooling Character of Mint Tablets Containing High Intensity Coolants In these comparative examples, duo or trio-layer mint tablets were prepared using several high intensity coolants, and the cooling effects were evaluated. The amount of coolant and cooling character of the resulting mint tablets are set forth in Table 1 below.

TABLE 1

|  | Coolant | | | | Cooling |
| --- | --- | --- | --- | --- | --- |
|  | WS-3 | WS-5 | WS-23 | Isopulegol | Character |
| Comparative Example 1 | 100 ppm | — | — | — | weak initial cooling impact lack of nasal cool |
| Comparative Example 2 | — | 200 ppm | — | — | weak initial cooling impact strong and lingering oral cool after consumption lack of nasal cool |
| Comparative Example 3 | — | — | 0.125% (0.5% outer layer) | — | weak initial cooling impact strong and lingering cooling after consumption lack of nasal cool |
| Comparative Example 4 | — | — | — | 0.5% (2% outer layer) | lack of nasal cool bitter taste |
| Comparative Example 5 | — | 500 ppm | 500 ppm | — | lack of nasal cool weak initial cooling impact strong and lingering oral cool afterwards consumption |

As can be seen from Table 1, most of the coolants delivered a strong overall oral cool after two minutes of consumption, and had a cooling effect that lasted for a longer duration. However, none of the compressed mint tablets showed a strong initial cooling effect. None of the tablets exhibit a strong nasal cooling character.

Examples 1-10: Multi-Layered Mint Tablets

In these examples, compressed mint tablets containing a high level of eucalyptol and menthol were formulated using a multi-layer approach. Tablets were formulated as either a duo layer tablet, a trio layer tablet, or a coated tablet. High levels of eucalyptol and various forms of menthol were incorporated into the second and third (when present) confectionery composition(s), which were used to form the thinner (or "coating") layer(s) of the tablets.

First Layer. The first confectionery composition used to form the first (or "center") layer of the tablets used in Examples 1-10 was prepared according to the formulation set forth in Table 2.

TABLE 2

First confectionery composition

| Ingredient | Amount (% by weight) |
| --- | --- |
| Soibitol | 98.506% |
| Acesulfame K | 0.080% |
| Aspartame | 0.120% |
| Sucralose | 0.060% |
| Menthol* | 0.200% |
| Eucalyptol | 0.060% |
| Magnesium Stearate | 0.974% |
| TOTAL | 100% |

*Dissolve in eucalyptol and add to the mixture

Second and Third Layers. The second confectionery composition (used to form the second or "thinner" layer of the tablets) was prepared according to the formulation set forth in Table 3. The third confectionery composition (used to form the third or "thinner" layer of the trio layer tablets) was also prepared according to the formulation in Table 3.

TABLE 3

Second and third confectionery compositions

| Ingredient | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| Sorbitol | 95.78% | 95.78% | 92.96% | 91.96% | 90.96% | 92.96% | 90.96% | 84.96% | 90.96% | 92.96% |
| Acesulfame K | 0.480% | 0.480% | 0.480% | 0.480% | 0.480% | 0.480% | 0.480% | 0.480% | 0.480% | 0.480% |
| Aspartame | 0.720% | 0.720% | 0.720% | 0.720% | 0.720% | 0.720% | 0.720% | 0.720% | 0.720% | 0.720% |
| Sucralose | 0.360% | 0.360% | 0.360% | 0.360% | 0.360% | 0.360% | 0.360% | 0.360% | 0.360% | 0.360% |
| Eucalyptol | 0.500%* | 0.500% | 0.500% | 0.500% | 0.500% | 0.500%* | 0.500% | 0.500% | 0.500% | 0.500% |
| Menthol, neat | 1.2%* | | | | | | | | | |
| Menthol, large particle size | | 1.2% | | | | | | | | |
| Evogran ®-menthol[1] (20% menthol) | | | 4% | 5% | 6% | | | | | |
| Magnesium stearate-menthol[2] (30% menthol) | | | | | | | | 4% | | |
| Polysaccharidementhol[3] (20% menthol) | | | | | | | | | 6% | |

TABLE 3-continued

Second and third confectionery compositions

| Ingredient | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Cyclodextrin-menthol, 10% loading | | | | | | | | 12% | | |
| Cyclodextrin-menthol, 20% loading | | | | | | | | | 6% | |
| Cyclodextrin-menthol, 30% loading | | | | | | | | | | 4% |
| Green color | 0.015% | 0.015% | 0.015% | 0.015% | 0.015% | 0.015% | 0.015% | 0.015% | 0.015% | 0.015% |
| Magnesium stearate | 0.945% | 0.945% | 0.965% | 0.965% | 0.964% | 0.947% | 0.947% | 0.947% | 0.947% | 0.965% |
| Total | 100% | 100% | 100% | 100% | 100% | 100% | 100% | 100% | 100% | 100% |

[1]Evogran ®-menthol (available from Symrise GmbH & Co.) is an encapsulated menthol containing ~45% by weight polydextrose.
[2]Magnesium stearate-menthol is a wax encapsulated menthol containing a mixture of fine grinded particles made from hot melt magnesium stearate and hot melt menthol.
[3]Polysaccharide-menthol is an encapsulated menthol formed by a combination of a hydrocolloid, methocellulose, and menthol grinded to particles.
*Dissolved in eucalyptus and added to the mixture The cyclodextrin-menthol used in Examples 8, 9 and 10 was prepared by spray-dry encapsulating menthol with gamma-cyclodextrin. The desired concentration of menthol and gamma-cyclodextrin were mixed with deionized water with a homogenizer to form a menthol-cyclodextrin slurry. The slurry was introduced into a spray-dry apparatus to produce cyclodextrin-menthol capsules, which were incorporated into the compositions.

Duo layer tablets were prepared by adding the first confectionery composition into a tablet mold, adding the second confectionery composition into the mold on top of the first confectionery composition, and compressing to form the tablet. Trio layer tablets were prepared by adding the second confectionery composition into a tablet mold; adding the first confectionery composition into the mold on top of the second confectionery composition; and adding the third confectionery composition into the mold on top of the first confectionery composition, and compressing to form the tablet. The coated tablets were prepared by compressing the first confectionery composition in a tablet mold, and pan coating the compressed first confectionery composition with the second confectionery composition using the kick coating procedure described in Example 13.

The overall weight of the mint tablets was 1.0 g, with the thinner ("coating") layer(s) accounting for 15% to 30% of the total tablet weight. The menthol level in the compositions used to form the thinner layers was about 0.7-1.3% by weight, with the total menthol content in each tablet being from 0.45-0.5% by weight of the tablet.

Example 11: Cooling Effects of Mint Tablets

In this example, a sensory evaluation was performed to evaluate the cooling and freshening effect of duo layer or trio layer mint tablets containing encapsulated menthol, as compared to trio layer mint tablets containing neat menthol. The duo and trio layer mint tablets containing the encapsulated menthol were prepared according to the formulation set forth for Example 9 above, and the trio layer mint tablets containing neat menthol were prepared according to the formulation set forth for Example 1 above. All three formulations contained the same amount of menthol and eucalyptol.

Subjects (n=6-8) were instructed to suck one piece of the compressed mint tablet, and evaluate it for cooling intensity, sweetness, and bitterness intensity. Cooling intensity was rated on a scale of 0-9. The time that maximum nasal cool was reached and the time it took for the mint tablet to dissolve completely were also reported. The results for the cooling intensity of the three tablets over time are set forth in FIG. 3.

Figure 3:
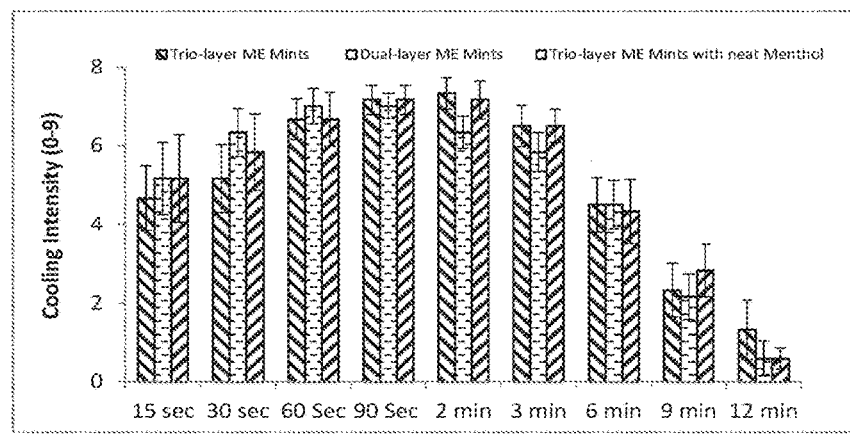
FIG. 3 is a chart depicting the cooling intensity over time of duo and trio layer mint tablets comprising encapsulated menthol as compared to trio layer tablets comprising neat menthol.

As can be seen from FIG. 3, the maximum cooling intensity was achieved in about 90 seconds for all three formulations. The average maximum nasal cool was reached at 40 seconds, and the average dissolution time for the mint tablets was about 4 minutes for all three formulations. As can be seen from FIG. 3, the cooling (and flavor) intensities lasted well beyond the point at which the mint tablet had fully dissolved. No significant difference in cooling intensity, sweet intensity, or bitterness/off-taste was noted among the three formulas.

Example 12: Menthol Stability (Encapsulated Menthol)

Compressed mint tablets containing high levels of menthol (e.g., >0.45%) may exhibit menthol sublimation from the mint matrix, resulting in the formation of "hairy crystal mints". The hairy menthol crystals may resemble mold or mildew, resulting in consumer dissatisfaction with the compressed mint tablets. This phenomenon is particularly significant at high humidity and low temperature environmental conditions.

In this example, the stability of various forms of menthol in duo layer mint tablets was evaluated under high humidity and low temperature conditions. Specifically, various forms of menthol, including encapsulated menthol, were evaluated to determine if modification of the menthol form (e.g., by encapsulation) would prevent menthol sublimation over product shelf-life.

The types of menthol evaluated in this example were: spray-dried (encapsulated) menthol (available from Firmenich Corp.,), Polysaccharide-menthol, wax-encapsulated menthol, menthol having a large particle size, Evogran®-menthol, and cyclodextrin-menthol. Duo layer mint tablets containing the spray dry menthol were prepared as described above for Example 1, except the neat menthol in the thinner ("coating") layer was replaced with a commercially available spray-dried menthol. Duo layer mint tablets containing the Polysaccharide-menthol, wax-encapsulated menthol, or menthol having a large particle size in the thinner layer were prepared using the formulations as described above for Examples 7 (Polysaccharide-menthol), 6 (wax-encapsulated menthol), and 2 (menthol with large particle size), respectively. Duo layer mint tablets containing 4% by weight, 5% by weight, or 6% by weight of Evogran®-menthol in the thinner layer were prepared by modifying the formulation as described above for Examples 3, 4 and 5 to contain the desired amount of Evograe-menthol in the thinner layer. Duo layer mint tablets comprising cyclodextrin-menthol (10% menthol loading), cyclodextrin-menthol (20% menthol loading) or cyclodextrin-menthol (30% menthol loading) in the coating layer were prepared using the formulations as described above for Examples 8, 9 and 10, respectively. To evaluate menthol stability, mints were placed in an unwrapped tin package, and stored at 20° C. and 85% relative humidity for up to 4 weeks. The results were compared to those of duo layer mint tablets containing neat menthol in the thinner layer (formulated as described above for Example 1). The results are described below and visually captured FIGS. 4A-4D.

Results

Figure 4A:
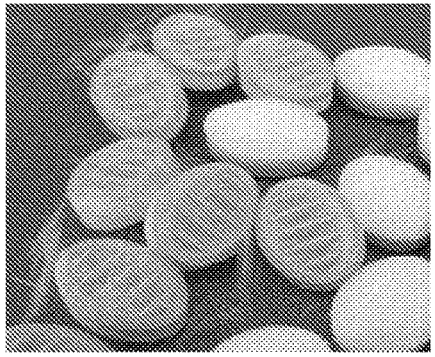
FIGS. 4A-4E are images of compressed mint tablets comprising various forms of menthol after storage for 3-4 weeks at 20° C., 85% relative humidity.

As can be seen from FIG. 4A, the duo layer mint tablets containing neat menthol exhibited hairy menthol crystal formation after storage for 3-4 weeks under high humidity conditions (20° C./85% relative humidity). The duo layer mint tablets containing the Polysaccharide-menthol (see FIG. 4C), wax-encapsulated menthol (not shown), or the large particle menthol (not shown) all showed improved humidity stability, as compared to the tablets containing neat menthol (FIG. 4A). Specifically, the mint tablets containing the Polysaccharide-menthol (see FIG. 4C), wax-encapsulated menthol, or large particle menthol showed no signs of hairy crystal formation after 3 weeks of ageing at 20° C./85% relative humidity conditions when combined with a desiccant (e.g., 1 g size for one pack of 34 g mints). However, duo layer mint tablets containing the Polysaccharide-menthol, wax-encapsulated menthol, or the large particle menthol exhibited hairy menthol crystal formation if no desiccant pack was provided (not shown). Duo layer mint tablets containing the commercially available spray-dried menthol (not shown) showed no difference in humidity stability as compared to the mint tablets containing the neat menthol.

Figure 4B:
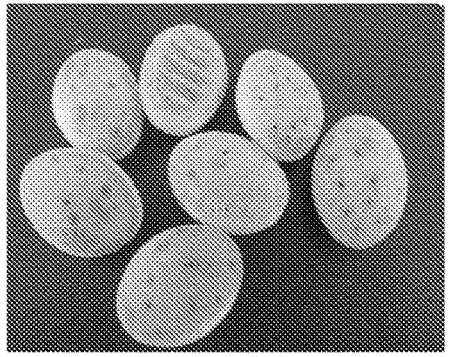
Figure 4C:
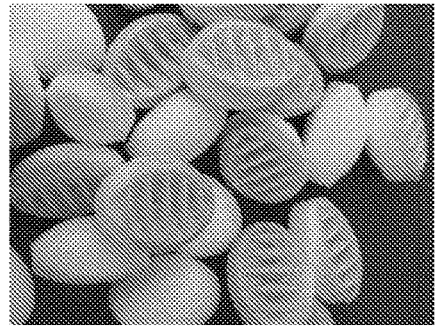

As can be seen from FIG. 4B, the duo layer mint tablets containing Evogran®-menthol did not exhibit menthol hairy crystal formation after storage for 3-4 weeks under high humidity conditions (20° C./85% relative humidity). The Evograe-menthol mint tablets did, however, develop a significant amount of dark spots over time (see FIG. 4B).

Figure 4D:

As can be seen from FIG. 4D, the duo layer mint tablets containing the cyclodextrin-menthol (10% menthol) or containing the cyclodextrin-menthol (20% menthol) exhibited no hairy crystal formation after ageing at 20° C./85% relative humidity conditions for 3-4 weeks, without the presence of a desiccant package.

Example 13: Intense Compressed Mints with a Soft Pan Coating (Coated Tablets)

In this example, the stability of menthol in coated compressed mint tablets was evaluated.

Coating Powder Blend. The powder blend used in the kick coating process was prepared using the formulation set forth in Table 4.

TABLE 4

Powder Blend Composition

| Ingredient | Amount in powder blend (%) | Amount in powder blend (grams) |
|---|---|---|
| Isomalt | 77.8% | 3.11 g |
| Acesulfame K | 3.2% | 0.13 g |
| Aspartame | 4.5% | 0.18 g |
| Sucralose | 2.5% | 0.10 g |
| Menthol-Eucalyptol mixture* | 12% | 0.48 g |
| Total | 100% | 4.0 g |

*Contains 75 wt % menthol and 25 wt % eucalyptol

The powder blend was prepared by adding 75 g of menthol to 25 g of eucalyptol, and warming to 45° C. to dissolve the menthol. The resulting menthol-eucalyptol mixture was combined with the isomalt and high intensity sweeteners in the amounts set forth in Table 4, and mixed prior to use.

Coating Syrup. The syrup used in the coating process was prepared using the formulation set forth in Table 5.

TABLE 5

Coating Syrup

| Ingredient | Amount in syrup (%) |
|---|---|
| Isomalt | 30.56% |
| Gum acacia | 7.64% |
| D.I. water | 57.29% |
| Acesulfame K | 4.51% |
| Total | 100% |

The coating syrup was prepared by adding the deionized water to a syrup tank equipped with an agitator, and vortexing. The gum acacia and acesulfame k were added to the vortexing deionized water, and agitated until a homogeneous solution was formed. The solution was heated to 66° C., followed by addition of the isomalt. The resulting syrup was maintained at a temperature of 64-68° C. with agitation until all ingredients were dissolved.

Coating. 1000 pieces of compressed first ("center") layer, with a piece weight of 0.60 g and prepared according to the formulation described above for Examples 1-10, were loaded into a coating pan. 3 g of the coating syrup was added to the pan, and spread evenly across the tablet bed for 60 seconds to wet the tablets. 4 g of the powder blend was spread evenly onto the wetted tablets twice (i.e., 8 total g of powder blend was added). The coating syrup and powder blend were alternately added to the coating pan until the tablet coating reached 10% of the total weight of the coated tablet (i.e., until the tablets contained 10% by weight coating layer and 90% by weight center layer). Once the amount of coating reached 10% of the total coated tablet weight, 3 g of the coating syrup was added to the pan to seal the coating. The tablets were allowed to dry prior to packaging.

Sensory evaluation of the coated mint tablets indicated that a high initial nasal cool was provided by quick dissolution of the menthol and eucalyptol in the coating layer, while the mint tablet center layer provided a duration and lingering cooling and freshening effect.

Example 14: Intense Mints with Xylitol Coating

In this example, the stability of menthol in xylitol syrup coated compressed mint tablets was evaluated. Xylitol-containing coating syrups containing low (0.5% by weight) or high (0.9% by weight) amounts of menthol in the coating layer were prepared. The coating formulas comprised of a xylitol coating syrup and a flavor blend including menthol and eucalyptol.

TABLE 6

Xylitol coating syrups

| Ingredient | Amount in coating syrup (%) |
|---|---|
| Xylitol | 69.5% |
| Maltodextrin | 6% |
| Mannitol | 3% |
| High intensity sweetener | 0.1% |
| D.I. water | 21.4% |

The coating syrups were prepared by mixing high intensity sweetener, xylitol, mannitol, maltodextrin, and water, and heating the resulting mixture to about 77° C. (170° F.) until all ingredients were dissolved and a homogeneous coating syrup was produced. 700 g of uncoated compressed mint tablet center layers, prepared according to the formulation described above for Example 1-10, with piece weight of 0.70 g, were loaded into a coating pan and continuously charged with the by the xylitol coating syrup using the formulations set forth in Table 6. A total of 2.2 g, (or 4.0 g) of flavor blend containing 67% of menthol and 33% of eucalyptol was added at the middle of coating stage to the desired amount of menthol and eucalyptol (0.5% and 0.9% menthol in the coating layer). The tablets were coated with xylitol syrup until mint tablets reaches to the desired pieces weight of 1.0 g.

Figure 4E:

To evaluate menthol stability, the mints were placed in an unwrapped tin package, and stored at 20° C. and 85% relative humidity. No hairy menthol crystals were observed after 3-4 weeks of ageing at 20° C. and 85% relative humidity as shown in FIG. 4E. The xylitol syrup coating thus provided a good protection and exhibited good humidity stability of menthol.

Example 15: Analysis of Menthol and Eucalyptol Levels in Mint Tablets

In this example, the retention of menthol and eucalyptol in mint tablets after storage was evaluated.

Mint tablets containing menthol, either neat or cyclodextrin-menthol were prepared according to the formulations set forth in Examples 1 and 9, respectively. The tablets were aged at 20° C. and 85% relative humidity for at least 4 weeks, and evaluated for menthol and eucalyptol retention.

Gas chromatography-mass spectrometry (GC-MS) was used to analyze the menthol and eucalyptol levels in the mint tablets. One mint tablet was dissolved by a mixture of 2 mL $CHCl_3$ and 2 mL of deionized water (DI water). The solution was centrifuged, and the $CHCl_3$ fraction was filtered and injected into a GC column. Separately, 1 piece of compressed mint tablet without any menthol or eucalyptol was dissolved by a mixture of 2 mL $CHCl_3$ and 2 mL of DI water, together with low, mid, and high levels of pure menthol and eucalyptol, respectively. The fraction of $CHCl_3$ was filtered and injected into the GC column as a calibration. The results are shown in FIGS. 5A-5B and 6A-6B.

Figure 5A:
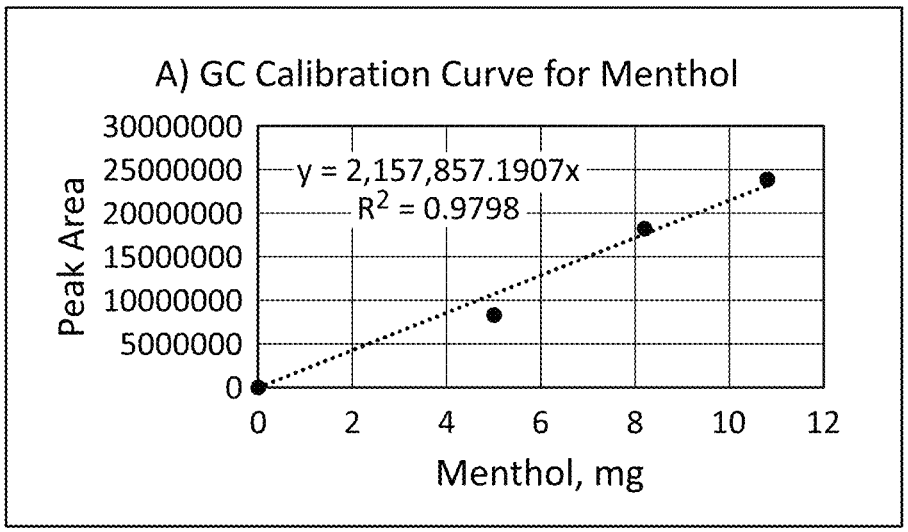
FIGS. 5A and 5B depict calibration curves for menthol (FIG. 5A) and eucalyptol (FIG. 5B) from gas chromatography-mass spectrometry analysis of menthol and eucalyptol levels in mint tablets after storage.
Figure 5B:
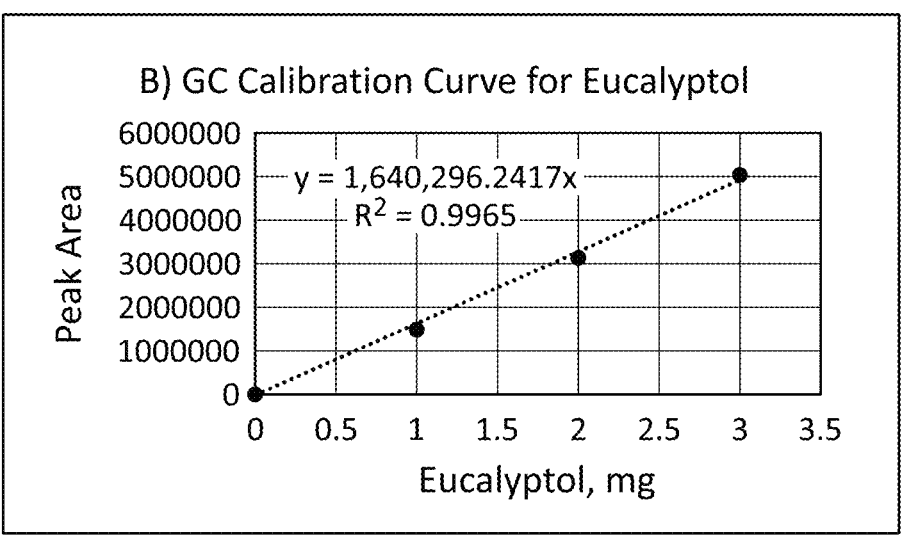
Figure 6A:
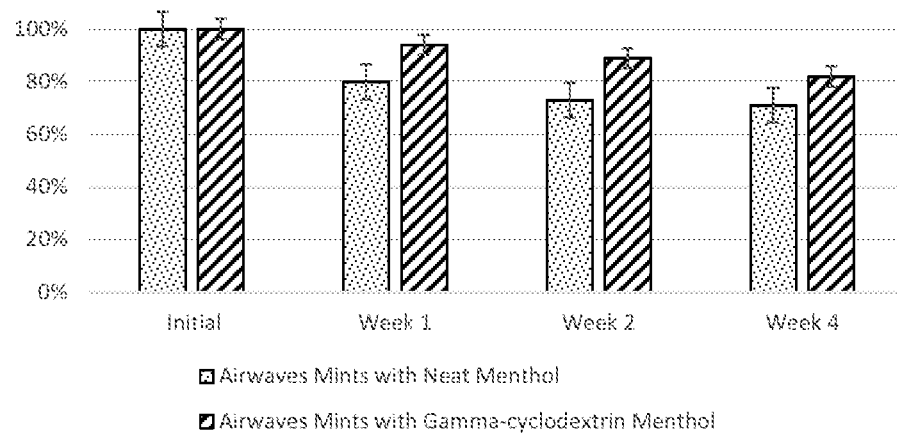
FIGS. 6A and 6B are charts depicting the recovery of menthol (FIG. 6A) and eucalyptol (FIG. 6B) in mint tablets comprising neat menthol or menthol encapsulated with gamma-cyclodextrin after storage at 20° C., 85% relative humidity for 4 weeks.

FIGS. 5A and 5B show the calibration curves for menthol (FIG. 5A) and eucalyptol (FIG. 5B). FIG. 6A shows the retention of menthol in the compressed mint tablets comprising encapsulated menthol, as compared to mints comprising neat menthol. A significant improvement in menthol retention was observed after storage for 4 weeks at 20° C./85% relative humidity (see FIG. 6A).

Figure 6B:
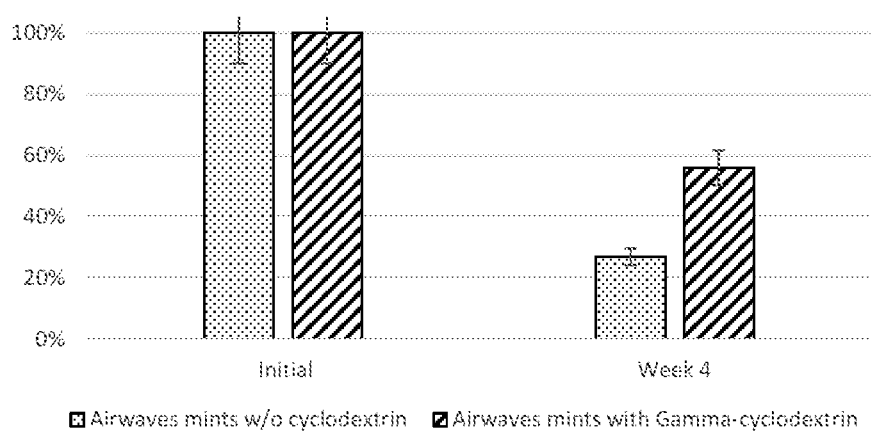

As can be seen from FIG. 6B, the recovery of eucalyptol was increased from 27% to 56% after storage for 4 weeks at 20° C./85% relative humidity, when the compressed mint tablets were formulated with cyclodextrin-menthol instead of neat menthol. It was unexpected that the presence of cyclodextrin-menthol in the mint tablet would improve the stability of the eucalyptol, since the eucalyptol was not directly encapsulated by the cyclodextrin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A confectionery product comprising a first layer comprising a first confectionery composition and a second layer comprising a second confectionery composition,
   wherein each layer of the confectionery product comprises nonencapsulated eucalyptol and menthol,
   wherein at least a portion of the menthol is encapsulated menthol with cyclodextrin, wherein a weight ratio of the menthol to the nonencapsulated eucalyptol in each layer of the confectionery product is from about 2:1 to about 5:1, and
   wherein the second confectionery composition comprises the menthol in an amount from about 0.5% to about 5% and the nonencapsulated eucalyptol in an amount of about 0.1% to about 3% by weight of the second confectionery composition.

2. The confectionery product of claim 1, wherein the confectionery product is a compressed mint tablet.

3. The confectionery product of claim 1, wherein the second confectionery composition comprises from about 5% to about 45% of the total weight of the confectionery product.

4. The confectionery product of claim 1, wherein the second confectionery composition comprises from about 5% to about 30% of the total weight of the confectionery product.

5. The confectionery product of claim 1, wherein the first confectionery composition and the second confectionery composition both comprise eucalyptol and menthol.

6. The confectionery product of claim 1, wherein the second confectionery composition comprises nonencapsulated eucalyptol and encapsulated menthol.

7. The confectionery product of claim 1, wherein the second confectionery composition comprises nonencapsulated eucalyptol in an amount of about 0.1% to about 1.5% by weight of the second confectionery composition.

8. The confectionery product of claim 1, wherein the second confectionery composition comprises from about 15% to about 30% of the total weight of the confectionery product.

* * * * *